United States Patent
Marupaduga

(10) Patent No.: US 11,265,945 B1
(45) Date of Patent: Mar. 1, 2022

(54) DYNAMIC RESTRICTION OF SPLIT-UPLINK-MODE OPERATION IN RESPONSE TO HIGH LEVEL OF VOICE MUTING

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/946,863

(22) Filed: Jul. 9, 2020

(51) Int. Cl.
*H04W 76/16* (2018.01)
*H04W 24/08* (2009.01)
*H04W 48/02* (2009.01)
*H04W 92/10* (2009.01)

(52) U.S. Cl.
CPC ........... *H04W 76/16* (2018.02); *H04W 24/08* (2013.01); *H04W 48/02* (2013.01); *H04W 92/10* (2013.01)

(58) Field of Classification Search
CPC ..... H04W 76/16; H04W 76/15; H04W 24/08; H04W 48/02; H04W 92/10
USPC ....................................................... 370/329
See application file for complete search history.

(56) References Cited

U.S. PATENT DOCUMENTS

| | | | |
|---|---|---|---|
| 8,185,060 B2 | 5/2012 | Agashe et al. | |
| 8,285,321 B2 | 10/2012 | Ji et al. | |
| 9,392,515 B2 | 7/2016 | Wang et al. | |
| 9,699,800 B2 | 7/2017 | Himayat et al. | |
| 10,104,584 B2 | 10/2018 | Cai | |
| 10,141,983 B2 | 11/2018 | Kim et al. | |
| 10,237,735 B2 | 3/2019 | Kim et al. | |
| 10,292,140 B2 | 5/2019 | Nam et al. | |
| 10,314,055 B1 | 6/2019 | Marupaduga et al. | |
| 10,652,786 B2* | 5/2020 | Stojanovski | H04W 88/06 |
| 2015/0043492 A1* | 2/2015 | Baek | H04W 76/15 370/329 |
| 2015/0085800 A1 | 3/2015 | Sivanesan et al. | |
| 2015/0181614 A1* | 6/2015 | Mitra | H04W 72/085 370/350 |
| 2016/0234714 A1* | 8/2016 | Basu Mallick | H04W 28/085 |
| 2018/0368199 A1* | 12/2018 | Zeng | H04W 72/0413 |
| 2019/0098606 A1 | 3/2019 | Sharma et al. | |
| 2020/0068639 A1* | 2/2020 | Kim | H04W 76/16 |

(Continued)

OTHER PUBLICATIONS

Tariq Mumtaz, et al., "Dual Connectivity-Based Mobility Management and Data Split Mechanism in 4G/5G Cellular Networks," IEEE Access, vol. 8, May 20, 2020.

*Primary Examiner* — Mong-Thuy T Tran

(57) ABSTRACT

A method and system for controlling application of split-uplink mode for dual-connectivity service in a system where a first access node provides service on a first air interface and a second access node provides service on a second air interface, and where (i) in a single-connection-uplink mode for the dual-connectivity service, uplink user-plane communication is carried on just the second air interface and (ii) in the split-uplink mode for the dual-connectivity service, uplink user-plane communication is split between the first air interface and the second air interface. An example method includes detecting at least a predefined threshold high level of uplink voice muting on the first air interface and responsively restricting application of the split-uplink mode for the dual-connectivity service.

19 Claims, 3 Drawing Sheets

---

IN A SYSTEM INCLUDING A FIRST ACCESS NODE PROVIDING SERVICE ON A FIRST AIR INTERFACE AND A SECOND ACCESS NODE PROVIDING SERVICE ON A SECOND AIR INTERFACE, AND IN WHICH THE ACCESS NODES COOPERATIVELY SUPPORT PROVIDING DUAL-CONNECTIVITY SERVICE, DETECT AT LEAST A PREDEFINED THRESHOLD HIGH LEVEL OF UPLINK VOICE MUTING ON THE FIRST AIR INTERFACE — 52

RESPONSIVE TO THE DETECTING OF AT LEAST THE PREDEFINED THRESHOLD HIGH LEVEL OF UPLINK VOICE MUTING ON THE FIRST AIR INTERFACE, RESTRICT APPLICATION OF SPLIT-UPLINK MODE FOR THE DUAL-CONNECTIVITY SERVICE — 54

(56) References Cited

U.S. PATENT DOCUMENTS

2020/0245387 A1\* 7/2020 Kwok .................... H04B 1/109
2020/0374893 A1\* 11/2020 Toeda ................... H04W 92/20

\* cited by examiner

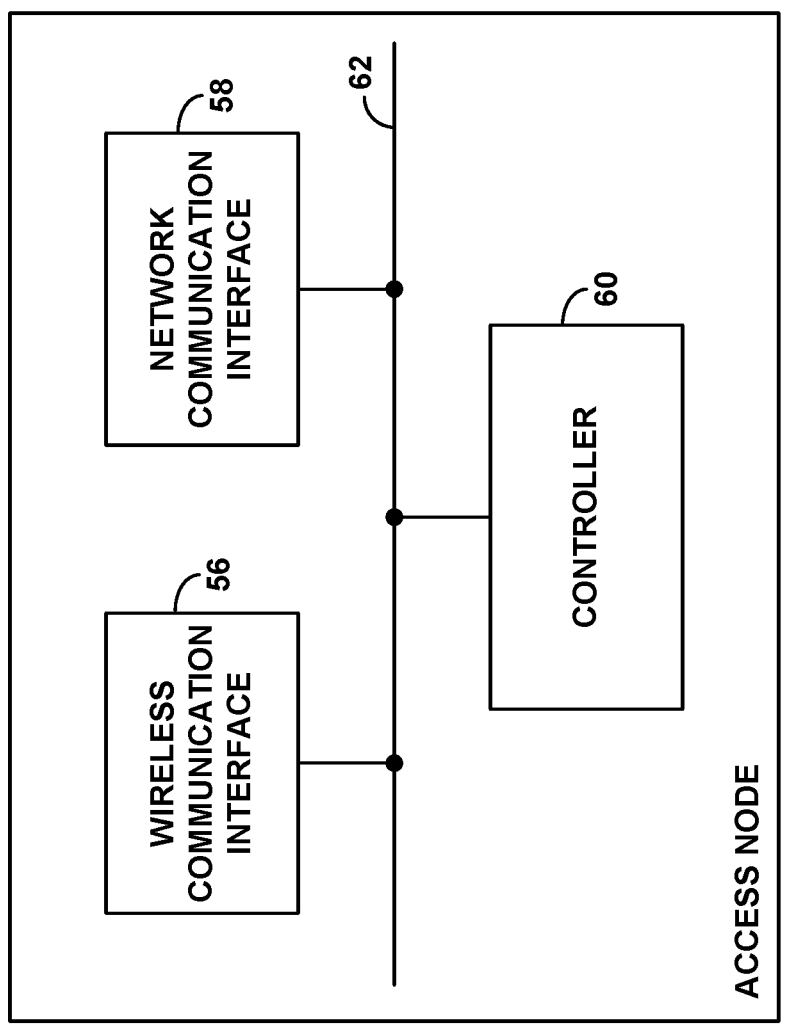

DYNAMIC RESTRICTION OF SPLIT-UPLINK-MODE OPERATION IN RESPONSE TO HIGH LEVEL OF VOICE MUTING

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the coverage of each access node could define an air interface configured in a specific manner to define physical resources for carrying information wirelessly between the access node and UEs.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of such a system, the UE could detect threshold strong coverage of an access node (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE. Further, if the UE is not already registered for service, the UE could engage in attach signaling via the access node with a core-network controller, to attach and thus register for service.

Upon initial attachment and/or at other times when serving a UE, the system could coordinate setup for the UE of one or more user-plane bearers, each defining a logical packet flow for packet-data communications between the UE and a core-network gateway system that provides connectivity packet-data network connectivity. For instance, after authenticating and authorizing the UE, the core-network controller could engage in signaling with the access node and with the gateway system, to coordinate setup of each such bearer, including a radio-bearer portion extending between the UE and the access node and an access-bearer portion extending between the access node and the gateway system.

Each such bearer could support communication between the UE and the gateway system and thus ultimately between the UE and the packet data network with which the gateway system provides connectivity. When data on the network arrives at the gateway system for transmission to the UE, the data could then flow over a bearer from the gateway system to the access node and from the access node to the UE. And when the UE has data to transmit on the packet data network, the data could flow over a bearer from the UE to access node and from the access node to the gateway system for output onto the packet data network.

Further, for the air-interface portion of each such transmission, the access node could coordinate allocation of air-interface resources to carry the data between the access node and the UE. With the example air-interface configuration noted above, for instance when the access node has data to transmit to the UE, the access node could allocate one or more downlink PRBs in an upcoming subframe for carrying a block of the data to the UE and could then transmit the data to the UE in the allocated PRB(s). And when the UE has data to transmit to the access node, the UE could transmit to the access node a buffer status report (BSR) indicating how much data the UE has buffered for transmission, the access node could allocate one or more uplink PRB(s) in an upcoming subframe for carrying a block of that data from the UE, and the UE could then transmit the data to the access node in the allocated PRB(s).

In a representative system, each bearer that is established for the UE could have a corresponding defined quality-of-service (QoS) service level, which could be indicated by one or more bearer attributes stored in context records for the UE at entities along the bearer path, such as at the UE, the access node, and the gateway system. For instance, each bearer could be associated with a particular QoS Class Identifier (QCI) and/or Differential Services Point Code (DSCP) value that defines various QoS attributes of the bearer, such as packet-delay budget, acceptable packet-loss rate, minimum or maximum bit rate, and the like. Entities along the bearer communication path could then work to handle communications on the bearer accordingly.

The QCI or DSCP value of each such bearer could also correspond with the type or class of data that would be communicated on the bearer, and data communications of particular types could thus be provided on appropriate bearers. For instance, QCI 1 could denote conversational voice traffic, QCI 2 could denote conversational video traffic, QCI 3 could denote gaming traffic, QCI 4 could denote buffered/streaming video traffic, QCI 5 could denote signaling with an Internet Multimedia Subsystem (IMS) for setting up and controlling real-time media communications such as voice calls, and other QCIs might denote other sorts of traffic.

When a UE first attaches, the system could thus initially configure for the UE one or more bearers, depending on UE configuration and capability. For instance, the system could initially configure for the UE of a best-efforts QCI-8 or 9 bearer to carry general Internet communications. Further, to enable voice-over-Internet-Protocol (VoIP) service hosted by an IMS, the system may also initially configure for the UE a QCI-5 bearer to carry VoIP-call setup and management signaling (e.g., Session Initiation Protocol (SIP) signaling) between the UE and the IMS.

In addition, when appropriate during service of the UE, the system could also configure for the UE one or more additional bearers. For instance, if and when the UE engages in signaling with the IMS to set up a VoIP call, the system could responsively configure for the UE a QCI-1 bearer for carrying packetized voice communications of the call. The UE could then engage in the VoIP call, transmitting and receiving packetized voice communications over that QCI-1 bearer, and the UE could engage in further VoIP-call-related signaling over its QCI-5 bearer if and when necessary.

Optimally, a wireless service provider will strategically implement access nodes throughout a market area so that served UEs can move between the access nodes' coverage areas without loss of coverage. Each access node could include an antenna structure and associated equipment, and the wireless service provider could connect the access node by a landline cable (e.g., fiber backhaul) with the service provider's core network, to enable the access node to communicate with the core-network controller, the gateway system, other access nodes, and the like.

In certain locations, however, it may be impractical for a wireless service provider to run landline connections to access nodes. For instance, where a service provider seeks to provide many small coverage areas blanketing a market area or to fill in coverage holes between coverage of other access nodes, the service provider may implement many small-cell access nodes throughout the market area, but it may be inefficient, impossible, or undesirable to run landline cables to every one of those small-cell access nodes.

To connect an access node with the core network in such a situation for instance, the wireless service provider could implement a wireless relay backhaul connection in which the access node includes or is interconnected with a special UE that is served by an access node already connected with the core network. With this arrangement, the existing core-network-connected access node is referred to as a "donor access node," the special UE is referred to as a "relay-UE" (or "UE-relay"), and the access node at issue is referred to as a "relay access node." Further, the core network could include a special gateway system (e.g., "relay-gateway system") that could be an endpoint for bearers configured for the relay-UE, to provide the relay access node with connectivity to the core network.

In operation with this arrangement, the donor access node could serve the relay-UE in much the same way as any access node would serve a UE (as discussed above for instance), the relay-UE could interface with the relay access node, operating as an intermediary between the relay access node and the donor access node, and the relay access node could serve other UEs in much the same way as any access node would. Further, the donor access node could also operate as a standard access node, serving non-relay end-user UEs that connect with the donor access node.

When the industry advances from one generation of wireless technology to the next, or in other scenarios, networks and UEs may also support dual-connectivity service, where a UE is served on co-existing connections, perhaps according to multiple different RATs.

For instance, a first access node could provide service according to a first RAT and a second access node could provide service according to a second RAT, and a UE positioned concurrently within coverage of both the first and second access nodes could have a first radio configured to engage in service according to the first RAT and a second radio configured to engage in service according to the second RAT. With this arrangement, the UE within coverage of both access nodes may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection (as "standalone" connectivity).

In a representative dual-connectivity implementation, the first access node operating according to the first RAT ("first-RAT access node) could function as a primary access node or master node (MN), responsible for coordinating setup and teardown of dual-connectivity service for the UE and functioning as an anchor point for RRC signaling and core-network control signaling related to the dual-connected UE. And the second access node operating according to the second RAT ("second-RAT access node") could function as a secondary access node or secondary node (SN) mainly to provide additional connectivity and increased aggregate bandwidth for the UE.

In such an implementation, when the UE first enters into network coverage, the UE could scan for coverage on the first RAT and could discover threshold strong coverage of the first-RAT access node and responsively establish a first connection between the UE and the first-RAT access node ("first-RAT connection") as discussed above, and the UE could attach with the core network if appropriate. The first-RAT access node could then serve the UE in a first-RAT standalone mode (i.e., under just the first RAT) with packet-data communications as described above for instance.

In relation to the UE's attachment, and/or at another time, the first-RAT access node could also receive from the UE or the core-network controller a capability report that indicates various capabilities of the UE, including for instance whether the UE is dual-connectivity capable. If the UE is dual-connectivity capable, the first-RAT access node could then trigger and/or engage in a process to establish for the UE a second connection between the UE and a second-RAT access node ("second-RAT connection"), so that the first-RAT access node and second-RAT access node can then cooperatively provide the UE with dual-connectivity service.

In an example of this process, the MN could first identify an SN with which to establish the second-RAT connection for the UE, perhaps based on the UE reporting that the UE is within threshold strong coverage of the SN or based on an assumption (in certain situations) that the UE being in coverage of the MN means the UE is likely also in coverage of the SN.

Further, the MN could then engage in an SN-addition process to add for the UE a second-RAT connection with the SN. For instance, the MN could transmit over an X2 interface or other inter-access-node interface to the SN an SN-addition request message, providing RRC configuration information and/or other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then transmit a random-access signal to the SN, and the SN could respond to the UE with a random-access response message, which could complete establishment of the second-RAT connection for the UE.

In addition, for some dual-connectivity implementations, the MN could also engage in signaling process to transfer the access-bearer portion of one or more of the UE's bearer(s) from being between the gateway system and the MN to instead being between the gateway system and the SN. For instance, the MN could include in its SN-addition request to the SN information about the access bearer, and the MN could transmit to the core-network controller a bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above.

In an example implementation, downlink user-plane data flow would be split between the UE's two connections. For instance, when the gateway system receives data destined to the UE, that data could flow over a UE bearer from the gateway system to the SN, and the SN and MN could then share transmission of that data to the UE. Namely, the SN could send a portion of the data over an X2 interface or the like to the MN, and the MN could schedule and provide transmission of that portion of data to the UE on one or more downlink PRBs of the UE's first-RAT connection. And the SN could itself schedule and provide transmission of another portion of the data to the UE on one or more downlink PRBs of the UE's second-RAT connection.

But in the example implementation, uplink user-plane data flow may or may not be split between the UE's two connections. In particular, the system could be configured to serve the UE in either a "single-connection-uplink mode" or a "split-uplink mode" mode.

In the single-connection-uplink mode, the UE's uplink data flow would be limited to just one of the UE's two connections, perhaps just the UE's second-RAT connection with the SN for instance. Thus, when the UE has data to transmit, the UE could send a scheduling request to just the access node providing that one connection, the access node could schedule transmission of the data from the UE on PRBs of that connection as noted above, the UE could accordingly transmit the data on the PRBs as scheduled, and the data could flow over a UE bearer to the gateway system.

Whereas, in the split-uplink mode, the UE's uplink data flow would be split between the UE's two connections, perhaps when there is or will be sufficient uplink data flow from the UE to justify doing so. Thus, when the UE has data to transmit, the UE could send to the MN a scheduling request for transmission of a portion of the data, the MN could schedule transmission of that portion of the data from the UE on one or more uplink PRBs of the UE's first-RAT connection, the UE could accordingly transmit that portion of the data to the MN as scheduled, the MN could forward that portion of the data to the SN, and that portion of data could flow over a UE bearer to the gateway system. And the UE could send to the SN a scheduling request for transmission of another portion of the data, the SN could schedule transmission of that other portion of the data from the UE on one or more uplink PRBs of the UE's second-RAT connection, the UE could accordingly transmit that other portion of the data to the SN as scheduled, and the that other portion of data as well could flow over a UE bearer to the gateway system.

In a system where at least two access nodes provide overlapping coverage, the access nodes could advantageously serve each of multiple UEs with dual connectivity as described above. Namely, each UE could establish a first connection with one of the access nodes and a second connection with the other access node, and the access nodes could then concurrently serve the UE over those connections, thus enabling the UE to benefit from increased peak data rate. In practice, one or more of these served UEs could be a relay-UE, and one or more other of these served UEs could be an end-user (non-relay) UE. Further, the access nodes could serve multiple such dual-connected UE in the split-uplink mode rather than the single-connection-uplink mode.

One technical problem that can arise from serving dual-connected UEs in the split-uplink mode, however, is that doing so could result in added load on an air interface that supports VoIP communication, which could in turn contribute to voice muting on that air interface.

In particular, in a system where first and second access nodes support cooperatively providing dual-connectivity service and where a single-connection-uplink mode would limit uplink communication to occur on just the second access node's air interface, application of split-uplink mode rather than single-connection-uplink mode would add load to the first access node's air interface. Namely, by applying split-uplink mode, some of the uplink communication that would have occupied the second access node's air interface will then instead occupy the first access node's air interface. And if and when the first access node serves VoIP communications on that first air interface, this added load may unfortunately contribute to voice muting of those VoIP communications.

Voice muting is effectively a muting of audio in an ongoing VoIP call, resulting from failure to communicate voice packets during the call. Normally in a VoIP call, each participating party may generate and transmit voice packets at a regular rate, such as every 20 milliseconds for instance, with each voice packet carrying digitized voice-band audio for playout by the other party or being coded to cause the other party to play out natural background noise when there is no talking in the call. When an access node's air interface is too heavily loaded, however, the access node may be unable to schedule transmission of these voice packets over the air interface in a timely manner. And that could result in some of the packets not being processed for playout, which could create breaks in the audio.

The present disclosure provides a mechanism to help address this issue.

The disclosed mechanism could apply in a system as noted above, in which a first access node provides service on a first a first air interface and a second access node provides service on a second access node, and where the first and second access nodes support cooperatively providing dual-connectivity service (i) in a single-connection-uplink mode where uplink communication (i.e., scheduled user-plane communication) would occur on just the second air interface and (ii) in a split-uplink mode where the uplink communication would be split between the first air interface and the second air interface.

In accordance with the disclosure, the system will detect at least a predefined threshold high level of uplink voice muting on the first air interface, and, in response to detecting at least the predefined threshold high level of uplink voice muting on the first air interface, the system will restrict application of the split-uplink mode for the dual-connectivity service, so as to help control uplink load on the first air interface and possibly to help reduce or minimize the level of voice muting on the first air interface.

In an example implementation, restricting application of the split-uplink mode for the dual-connectivity service could involve re-configuring the system to disable the split-uplink mode for the dual-connectivity service (e.g., to prevent any new activation of split-uplink mode for the dual connectivity service). Alternatively, restricting application of the split-uplink mode for the dual-connectivity service could involve re-configuring the system to disable the split-uplink mode for certain dual-connected UEs, such as for relay-UEs or other UEs that are likely to contribute heavily to uplink load in the first cell, while still allowing use of the split-uplink mode for other dual-connected UEs. And still alternatively, restricting application of the split-uplink mode for the dual-connectivity service could involve modifying a trigger condition to reduce likelihood of activating the split-uplink mode for dual-connected UEs, and/or could involve changing an uplink-split ratio to reduce associated uplink data flow on the first air interface.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is a simplified block diagram of an example access node operable in accordance with the present disclosure.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
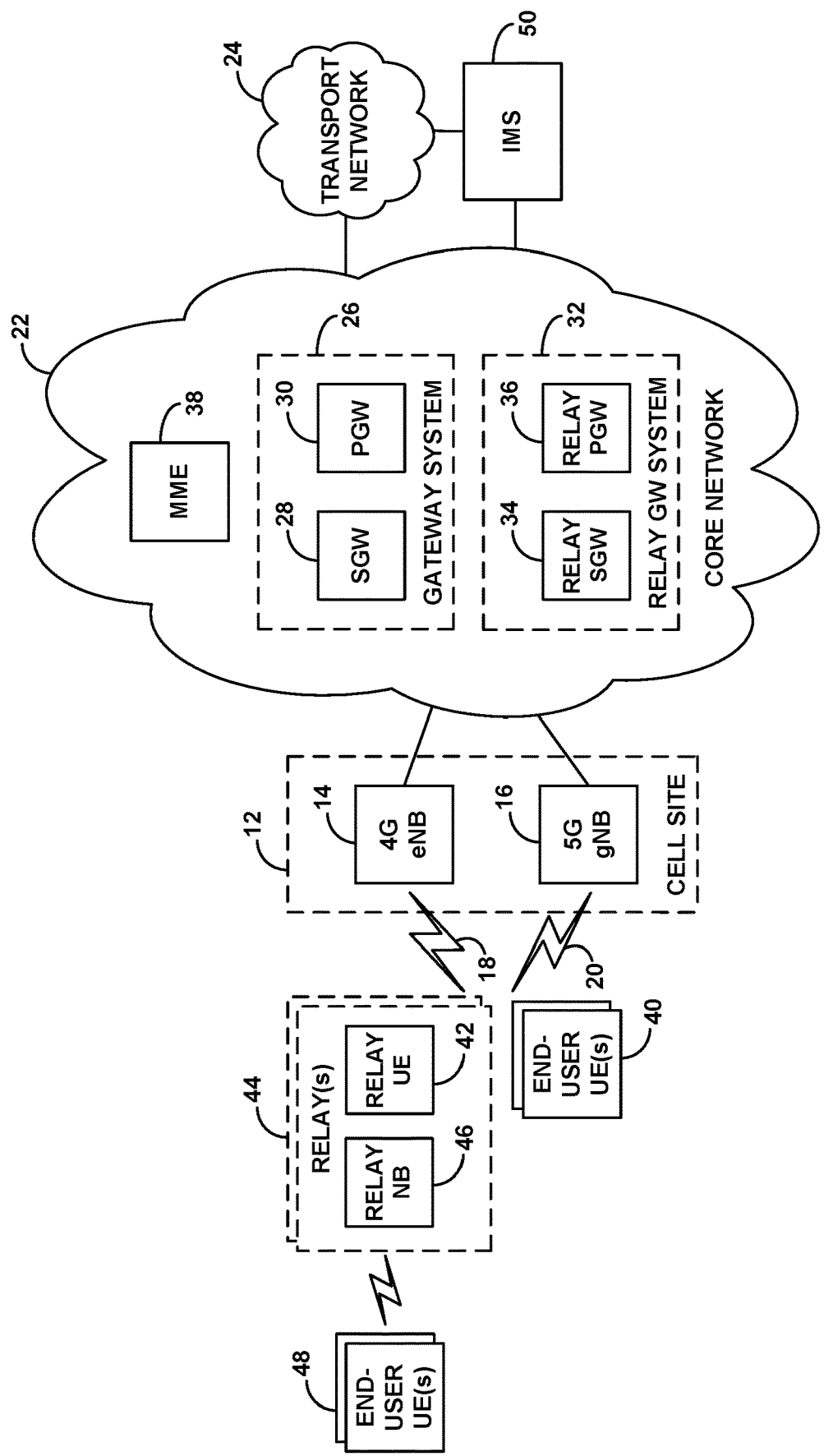
FIG. 1 is a simplified block diagram of an example network arrangement in which features of the present disclosure can be implemented.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, relays, femtocell access nodes, or the like, possibly configured to provide a smaller range of coverage.

Each access node could have a respective antenna structure that is configured to transmit and receive electromagnetic signals in a region defined by an antenna pattern or radiation pattern. Further, each access node could provide coverage on at least one respective carrier according to a respective RAT. For instance, the 4G eNB 14 could provide 4G coverage 18 on one or more 4G carriers, and the 5G eNB 16 could provide 5G coverage 20 on one or more 5G carriers.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26, having a serving gateway (SGW) 28 and a packet-data network gateway (PGW) 30, which provides user-plane connectivity with the transport network 24. Further, the core network includes a relay-gateway system 32, having a relay-SGW 34 and a relay-PGW 36, which provides internal-core-network connectivity to facilitate communicating with other core-network entities. And the core network is also shown including a mobility management entity (MIME) 38, which serves as a core-network controller. Other core-network arrangements are also possible.

FIG. 1 also illustrates multiple example UEs 40, 42 within coverage of both the 4G eNB 14 and the 5G gNB 16. Some or all these UEs could be equipped with a 4G LTE radio, a 5G NR radio, and associated circuitry and logic that enables the UE to engage in 4G LTE service, 5G NR service, and EN-DC service. And the 4G eNB 14 and 5G gNB 16 could be configured to serve multiple UEs at once.

Each illustrated UE 40 is shown as an end-user UE that does not operate to provide connectivity for one or more other UEs. For instance, a UE 40 might be a cell phone, tablet computer, gaming device, machine-type-communication device, tracking device, embedded wireless module, or other wirelessly equipped communication device. (In practice, a UE 40 might be a smart phone or the like that includes hotspot functionality as well, but for present purposes that UE would be an end-user UE rather than a relay-UE, since UE does not operate as a dedicated mobile hotspot.)

When such a UE 40 initially enters into coverage of the illustrated network, the UE 40 could discover coverage of the 4G eNB 14, such as by scanning predefined 4G carriers to find a synchronization signal from the 4G eNB 14 and then determining that a reference signal from the 4G eNB 14 is strong enough to justify connecting. The UE 40 could then engage in random-access signaling and RRC signaling with the 4G eNB 14 to establish an RRC connection, and the 4G eNB 14 could establish a context record indicating the state of the UE's 4G connection and service.

With its RRC connection established, the UE 40 could then transmit to the 4G eNB 14 an attach request message, which the 4G eNB 14 could forward to the MME 38 for processing. And upon authenticating and authorizing the UE 40 for service, the MME 38 and 4G eNB 14 could coordinate setup for the UE 40 of at least one user-plane bearer. In particular, the MME 38 could engage in signaling with the 4G eNB 14 and the SGW 28 to coordinate setup for the UE 40 of an S1-U packet tunnel between the 4G eNB 14 and the SGW 30, and the SGW 28 could responsively engage in signaling with the PGW 30 to coordinate setup for the UE 40 of an associated S5 packet tunnel between the SGW 28 and the PGW 30. Further, the 4G eNB 14 could engage in signaling with the UE 40 to establish for the UE an associated a data radio bearer (DRB).

Once the UE 40 is so connected and attached, the 4G eNB 14 could then serve the UE 40 in a standalone-4G mode, as discussed above.

Each illustrated UE 42, on the other hand, is shown as a relay-UE, which operates to provide connectivity for one or more other UEs. By way of example, the figure illustrates each relay-UE 42 being part of a relay 44 that also includes a relay access-node 46 (e.g., relay Node-B (NB)). With this arrangement, the relay-UE 42 could connect with and be served by one or more donor NBs such as the 4G eNB 14 and/or the 5G gNB 16, and the relay-UE could be integrated or interconnected with the relay access node 46 that could serve one or more other UEs 48 in much the same way as a conventional access node would, as discussed above for instance.

When each such relay-UE 42 initially enters into coverage of the illustrated network, the UE 42 could discover coverage of the 4G eNB 14, such as by scanning predefined 4G carriers to find a synchronization signal from the 4G eNB 14 and then determining that a reference signal from the 4G eNB 14 is strong enough to justify connecting. The relay-UE 42 could then engage in random-access signaling and RRC signaling with the 4G eNB 14 to establish an RRC connection, and the 4G eNB 14 could similarly establish a context record indicating the state of the UE's 4G connection and service.

As part of this signaling, the relay-UE 42 could convey to the 4G eNB 14 an indication that the UE 42 is a relay-UE rather than an end-user UE. For instance, the UE-relay 42 might transmit a special public land mobile network (PLMN) identifier that correlates with the UE 42 being a UE-relay. Through this and/or other information, the 4G eNB 14 could thereby determine that the UE 42 is a relay-UE rather than an end-user UE and could accordingly record that fact in its context record for the relay-UE 42.

With its RRC connection established, the relay-UE 42 could then similarly transmit to the 4G eNB 14 an attach request message, which the 4G eNB 14 could forward to the MME 38 for processing. This attach request may also include an indication that the UE is a relay-UE (e.g., rather than an end-user UE). Therefore, upon authenticating and authorizing the relay-UE 42 for service, the MME 38 and 4G eNB 14 could coordinate setup for the relay-UE 42 of at least one user-plane bearer with the relay-gateway system 32 rather than with the conventional gateway system 26. For instance, the MME 38 could engage in signaling with the 4G eNB 14 and the relay-SGW 34 to coordinate setup for the relay-UE 42 of an S1-U packet tunnel between the 4G eNB 14 and the relay-SGW 34, and the relay-SGW 34 could responsively engage in signaling with the relay-PGW 36 to coordinate setup for the relay-UE 42 of an associated S5 packet tunnel between the relay-SGW 34 and the relay-PGW 36. Further, the 4G eNB 14 could engage in signaling with the relay-UE 42 to establish for the relay-UE 42 an associated DRB.

Once the relay-UE 42 is connected and attached, the 4G eNB 14 could then similarly serve the relay-UE 42 in a standalone-4G mode in the manner discussed above, and the 4G connection and access-bearer established for relay-UE 42 could function as a relay backhaul interface through which relay-NB 46 could communicate on core network 22 as though relay-NB 48 had been directly connected with the core network 22.

Thus, with this arrangement, one or more end-user UEs 48 could connect with the relay-NB 46 and attach with the network. And user-plane communications between those end-user UEs 48 and the gateway system 26 could then flow via the relay-NB 46, the relay-UE 42, the 4G connection between the relay-UE 42 and the 4G eNB 14 and the relay-UE's access-bearer between the 4G eNB 14 and the relay-PGW 36. Further, associated control signaling between relay-NB 46 and the core network 22 (e.g., signaling with MME 38) could likewise flow via the relay-UE 42, the 4G connection between the relay-UE 42 and the 4G eNB 14, and the relay-UE's access-bearer between the 4G eNB 14 and the relay-PGW 36.

For each of one or more of these UEs 40, 42, as a last step of the attachment process, the 4G eNB 14 could also transmit to the UE an RRC message carrying a UE-capability enquiry, and the UE could respond to the 4G eNB 14 with a "UE capability information" information element (IE), which could indicate that the UE is EN-DC capable. Alternatively, the 4G eNB 14 could discover in another manner that the UE is EN-DC capable.

For each such UE, the 4G eNB 14 could then work to configure EN-DC service for the UE. In line with the discussion above, for instance, the 4G eNB 14, operating as MN, could first engage in process to add the 5G gNB 16 as an SN for the UE, such as by transmitting to the 5G gNB 16 an SN-Addition request to cause the 5G gNB to allocate resources for a 5G connection for the UE on one or more 5G carriers, receiving an SN-Addition-Request acknowledge message from the 5G gNB 16, and engaging in associated RRC signaling with the UE, in response to which the UE could then access and complete establishment of the 5G connection. Further, the 4G eNB 14 could engage in signaling as described above to transfer to the UE's access bearer (e.g., the UE's S1-U tunnel) to the 5G gNB as well.

The 4G eNB 14 and 5G gNB 16 could then provide the UE with EN-DC service, concurrently serving the UE over their respective connections with the UE. Namely, the 4G eNB 14 could allocate PRBs of its 4G air interface as needed to carry data over the 4G connection between the 4G eNB 14 and the UE, and the 5G gNB could allocate PRBs of its 5G air interface as needed to carry data over the 5G connection between the 5G gNB 16 and the UE.

Further in line with the discussion above, the 4G eNB 14 and 5G gNB 16 (e.g., cell site 12) could be configured to support serving EN-DC-connected UEs in the split-uplink mode or in the single-connection-uplink mode. The choice between these modes of operation could be made on a per-UE basis and/or according to general policy applicable to multiple UEs. And the 4G eNB 14, as MN, could coordinate associated operation of the UE, through RRC signaling directives to the UE.

In an example implementation, serving an EN-DC-connected UE in the single-connection-uplink mode could involve limiting the UE's uplink communication to be on just its 5G connection with the 5G gNB 16. To facilitate this, the 4G eNB 14 could transmit to the UE an RRC message that directs the UE to limit all of its uplink user-plane communication to be with just the 5G gNB 16. Accordingly, when the UE has data to transmit, the UE could send scheduling requests to the 5G gNB 16, the 5G gNB 16 could allocate uplink PRB(s) of the 5G gNB's air interface to carry the data, and the UE could according transmit the data on the allocated PRB(s) to the 5G gNB 16.

On the other hand, serving an EN-DC-connected UE in the split-uplink mode could involve having the UE split its uplink data flow between its 4G connection and its 5G connection, possibly when the UE's uplink data flow is or may be threshold high. For instance, the UE's 5G connection might be configured as the UE's primary uplink connection, and (i) if and when the UE's uplink data flow and/or quantity of data buffered for uplink transmission is relatively low, the UE could be made to limit its uplink user-plane communication to be on just that 5G connection, but (ii) if and when the UE's uplink data flow and/or quantity of data buffered for uplink transmission is at least as high as a predefined threshold, the UE could be made to split its uplink user-plane communication between its 4G and 5G connections.

To facilitate operation in the split-uplink mode, the 4G eNB 14 could transmit to the UE an RRC message that directs the UE to split its uplink data flow between its 4G and 5G connections. Further, in this RRC message, the 4G eNB 14 could designate an uplink-split ratio, established based on one or more considerations, with the ratio defining what portion of the UE's uplink data the UE should transmit on its 4G connection versus on its 5G connection. In accordance with this directive, when the UE has data to transmit, (i) the UE could thus send to the 4G eNB 14 a scheduling directive for transmission of a portion of the data, the 4G eNB 14 could schedule that transmission on PRBs of the 4G eNB's air interface, and the UE could engage in the 4G transmission accordingly and (ii) the UE could send to the 5G eNB 16 a scheduling directive for transmission of another portion of the data, the 5G eNB 16 could schedule that transmission on PRBs of the 5G gNB's air interface, and the UE could engage in the 5G transmission accordingly.

FIG. 1 also illustrates an example IMS 50, which could support VoIP service and other packet-based real-time media communications. As shown, the IMS 50 could be accessible via the transport network 24 and/or through or as part of the core network 22. Further, although not shown, the IMS 50 could include various call session control functions (CSCFs) to facilitate SIP signaling and could include a media server to facilitate VoIP communication.

In an example implementation, each of various end-user UEs that is connected with the 4G eNB 14 and that supports VoIP communication could set up and engage in a VoIP call hosted by the IMS 50. For instance, through the UE's 4G connection and an IMS-signaling bearer, the UE could engage in SIP signaling with the IMS 50 to set a Real-time Transport Protocol (RTP) session through which the UE and IMS 50 would then exchange RTP packets carrying digitized voice-band audio or associated coding. Further, in relation to setup of this VoIP call, the MME 38 could coordinate setup for the UE of a QCI-1 bearer over which the RTP packets could flow between the UE and the PGW 30. With this VoIP call and QCI-1 bearer set up, RTP packets could then flow between the UE and the IMS 50, with the 4G eNB 14 coordinating air-interface transmission of those packets as discussed above.

As noted above, a problem that can arise with this arrangement is that application of split-uplink mode rather than single-connection-uplink mode for EN-DC-connected UEs could result in added load on the 4G eNB's air interface, which could contribute to voice muting in VoIP calls served by the 4G eNB 14.

In particular, if EN-DC-connected UEs would be served in the single-connection-uplink mode with their uplink communication occupying just the 5G gNB's air interface, then their uplink communication would not contribute to load on the 4G eNB's air interface. But if and to the extent EN-DC-connected UEs would instead be served in the split-uplink mode with their uplink communication being split between the 5G gNB's air interface and the 4G eNB's air interface, a portion of their uplink communication would then contribute to load on the 4G eNB's air interface. And that added load on the 4G eNB's air interface may contribute to issues with the 4G eNB 14 timely scheduling of RTP-packet transmission for VoIP calls, which could result in voice muting.

In line with the discussion above, this problem could be addressed by (i) detecting when there is a threshold high level of uplink voice muting on the 4G eNB's air interface and (ii) responsive to detecting a threshold high level of uplink voice muting on the 4G eNB's air interface, restricting application of the split-uplink mode, to help reduce the associated added load on the 4G eNB's air interface and perhaps to help reduce the associated voice muting on the 4G eNB's air interface.

This process could be carried by any of various entities in the arrangement of FIG. 1, among other possibilities. Without limitation, for instance, the process could be carried out by the 4G eNB 14 and/or by one or more associated entities. Further, or alternatively, the method could be carried out by a core-network element management system (EMS) or other such computing system.

In an example implementation, the 4G eNB 14 could monitor the level of uplink voice muting on the 4G eNB's air interface by monitoring for the absence of expected uplink voice packet (e.g., RTP packet) transmission on various QCI-1 bearers of UEs served the 4G eNB 14. As noted above, for instance, in a representative VoIP call, the expectation may be that the UE would transmit a voice packet every 20 milliseconds. Thus, for a given QCI-1 bearer, the 4G eNB 14 might detect an instance of voice muting by detecting the absence of one or more such expected voice packets, perhaps any absence of expected uplink data flow on the QCI-1 bearer. Alternatively, the UE, SGW, an S1 packet sniffer, and/or any other entity in the QCI-1 bearer path could engage in this monitoring and could inform the 4G eNB 14 of instances of voice muting.

The 4G eNB 14 could then regularly track a rate or other extent of such voice muting over a sliding window of time for instance. And the 4G eNB 14 could regularly compare that tracked extent of voice muting with a predefined level of voice muting that is deemed high enough to justify restricting operation in the split-uplink mode, to determine if the level of voice muting is threshold high. Further, the 4G eNB 14 could collect such operational data on a per time of day basis to facilitate predicting based on historical data that, at a given time of day, the level of voice muting is threshold high.

If and when the 4G eNB 14 detects through this or other processing that the tracked extent of voice muting is threshold high, the 4G eNB 14 could then responsively take action to restrict application of the split-uplink mode.

The act of restricting application of the split-uplink mode could take various forms.

By way of example, restricting application of the split-uplink mode could involve disabling application of split-uplink mode for UEs that are EN-DC-connected with the 4G eNB 14 and the 5G gNB, perhaps avoiding any new activation of split-uplink mode for EN-DC-connected UEs. For instance, the 4G eNB 14 might normally operate in a default mode in which the 4G eNB 14 would direct a UE operate in the split-uplink mode in response to a trigger condition such as a high level of uplink data flow or buffered uplink data. And the act of restricting application of the split-uplink mode could involve reconfiguring the 4G eNB 14 from that default mode to a reconfigured mode in which the 4G eNB 14 would not direct the UE to operate in the split-uplink mode even if that trigger condition occurs.

As another example, restricting application of the split-uplink mode could involve disabling application of the split-uplink mode for certain EN-DC-connected UEs, such as UEs that are likely to contribute more heavily to uplink load and possibly associated voice muting. For instance, as noted above, the 4G eNB 14 might normally operate in a default mode in which the 4G eNB 14 would activate split-uplink operation for any UE regardless of whether the UE is an end-user UE or a relay-UE. And the act of restricting application of the split-uplink mode could involve reconfiguring the 4G eNB 14 from that default mode to a reconfigured mode in which the 4G eNB 14 would forgo activation of split-uplink operation for relay-UEs (e.g., even if a trigger condition as noted above is met), while still allowing activation of split-uplink operation for end-user UEs. For instance, the 4G eNB 14 could refer to its stored context data to determine whether a served UE is a relay-UE or rather an end-user UE. And responsive to the UE being a relay-UE, the 4G eNB 14 could forgo activating the split-uplink mode.

As still another example, restricting application of the split-uplink mode could involve modifying a trigger condition for activating and thus applying the split-uplink mode. For example, the 4G eNB 14 might normally operate in a default mode in which the 4G eNB 14 would activate the split-uplink mode for a UE in response to the UE's uplink data flow and/or buffered uplink data being at least a threshold level. And the act of restricting application of the split-uplink mode could involve the 4G eNB 14 increasing that threshold level, so as to make activation of the split-uplink mode less likely.

Further, as yet another example, restricting application of the split-uplink mode could involve modifying an uplink split ratio so as to reduce an extent of associated uplink data flow on the 4G eNB's air interface in the split-uplink mode. For instance, the 4G eNB 14 might normally operate in a default mode in which the 4G eNB 14 would impose use of an uplink split ratio based on one or more factors. And the 4G eNB 14 might apply a weighting factor or other revision to change the uplink ratio so that the split would provide less associated data flow on the 4G eNB's air interface than it would without this reduction.

The 4G eNB 14 could impose any one or more of these or other reductions in application of the split-uplink mode by setting an operational flag and/or one or more other operational settings that govern operation of the 4G eNB 14, among other possibilities.

Note also that, while the discussion above focuses on an example implementation where VoIP communication occurs on the MN's air interface, where single-connection-uplink operation limits uplink communication to just the SN's air interface, and where split-uplink operation would add to load on the MN's air interface, other arrangements are possible as well. For example, another implementation could involve VoIP communication on the SN's air interface, single-connection-uplink operation limiting uplink communication to just the MN's air interface, and split-uplink operation adding to load on the SN's air interface. Here similarly, high voice muting on the MN's air interface could trigger a reduction in application of split-uplink mode, in an effort to limit or reduce the extent of voice muting on the MN's air interface.

Further, note that restricting application of split-uplink mode for dual-connectivity service differs from restricting application of the dual-connectivity service itself. UEs could be served with dual-connectivity without restriction, but the application of split-uplink mode in that dual-connectivity service could be restricted.

And still further, note that the principles discussed herein could extend to apply as well with respect to the downlink. For instance, the access nodes could support providing dual-connectivity service in a single-connection-downlink mode and in a split-downlink mode, and the system could detect a high level of downlink voice muting on the first access node's air interface and could responsively restrict application of split-downlink mode.

Yet further, note that the principles discussed herein could also extend to apply with respect to issues other than voice muting. For instance, at issue could be other metrics such as packet drops and/or packet transmission errors with respect to other sorts of real-time media communications, among other possibilities.

Figure 2:
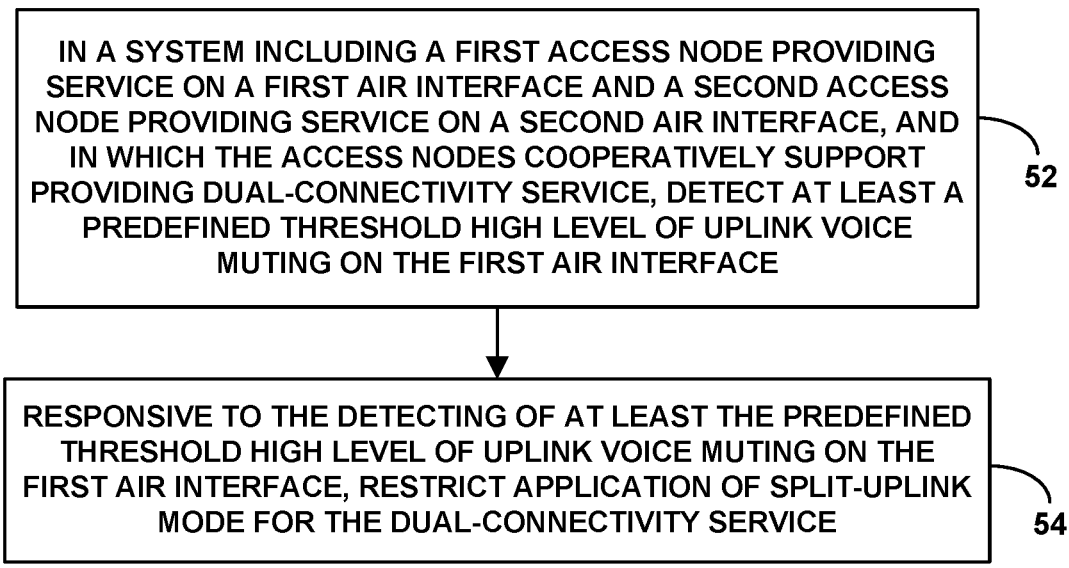
FIG. 2 is a flow chart depicting an example method in accordance with the present disclosure.

FIG. 2 is next a flow chart depicting an example method that could be carried out in accordance with the present disclosure, to control operation in a wireless communication system having a first access node that provides service on a first air interface and a second access node that provides service on a second air interface. As discussed above, the first and second access nodes could support cooperatively providing dual-connectivity service and could support operating in (i) a single-connection-uplink mode for the dual-connectivity service, with uplink user-plane communication being carried on just the second air interface and (ii) a split-uplink mode for the dual-connectivity service, with the uplink user-plane communication being split between the first air interface and the second air interface. For instance, one of the access nodes could control which of these modes would be applied for the dual-connectivity service.

As shown in FIG. 2, at block 52, the method includes detecting at least a predefined threshold high level of uplink voice muting on the first air interface. And at block 54, the method includes, responsive to the detecting of at least the predefined threshold high level of uplink voice muting on the first air interface, restricting application of the split-uplink mode for the dual-connectivity service.

In line with the discussion above, the act of detecting at least the predefined threshold high level of uplink voice muting on the first air interface could involve monitoring for absence of expected voice-packet transmission on a voice bearer traversing the first air interface (e.g., on a QCI-1 having a radio-bearer portion that extends over the first air interface).

Further, as discussed above, the act of detecting at least the predefined threshold high level of uplink voice muting on the first air interface could involve tracking an extent of uplink voice muting on the first air interface and comparing the tracked extent of uplink voice muting with a predefined threshold level of voice muting to determine if the tracked extent of uplink voice muting is at least as high as the predefined threshold level of voice muting.

In addition, as discussed above, the act of restricting application of the split-uplink mode for the dual-connectivity service could involve disabling application of the split-uplink mode for the dual-connectivity service. For instance, this could involve disabling application of the split-uplink mode for a first class of served devices (e.g., relay devices such as relay-UEs) while still allowing application of the split-uplink mode for a second class of served devices (e.g., non-relay devices, such as end-user UEs). And the disabling of the split-uplink mode for the dual-connectivity service could involve disabling new activation of the split-uplink mode for the dual-connectivity service while still allowing already-activated split-uplink mode for the dual-connectivity service.

Still further, as discussed above, the act of restricting application of the split-uplink mode for the dual-connectivity service could involve modifying a trigger condition for application of the split-uplink mode for the dual-connectivity service, so as to reduce a likelihood of activating the split-uplink mode for the dual-connectivity service. For instance, as to a served device, the trigger condition could comprise a quantity of uplink data communicated by or buffered by the served device being at least a predefined threshold quantity, and modifying the trigger condition could involve increasing the predefined threshold quantity.

Yet further, as discussed above, the act of restricting application of the split-uplink mode for the dual-connectivity service could involve changing an uplink-split ratio to reduce associated uplink data flow on the first air interface.

FIG. 3 is next a simplified block diagram of an example first access node that could operate in accordance with the present disclosure. As shown, the example first access node includes a wireless communication interface 56, a network communication interface 58, and a controller 60, all of which could be integrated together and/or communicatively linked together by a system bus, network, or other connection mechanism 62.

In line with the discussion above, a wireless communication system could include the first access node and a second access node, the first access node could be configured to provide service on a first air interface and the second access node configured to provide service on a second air interface, and the first and second access nodes could support cooperatively providing dual-connectivity service and could support operating in (i) a single-connection-uplink mode for the dual-connectivity service, with uplink user-plane communication being carried on just the second air interface and (ii) a split-uplink mode for the dual-connectivity service, with the uplink user-plane communication being split between the first air interface and the second air interface.

In an example implementation, the wireless communication interface 56 could comprise an antenna structure, which could be tower mounted or could take other forms, and associated components such as a power amplifier and a wireless transceiver, so as to facilitate providing a coverage area defining the first air interface and engaging air-interface communication on the first air interface. And the network communication interface 58 could comprise a wired or wireless interface, such as an Ethernet network communication interface, configured to support communication with other entities, such as with the second access node and various core-network entities.

Further, controller 60 could comprise one or more processing units (e.g., one or more general purpose processors and/or specialized processors) programmed to cause the first access node to carry out various operations such as those discussed above. For instance, the controller could comprise one or more non-transitory data storage units (e.g., one or more magnetic, optical, or flash storage components) which could store program instructions executable by the one or more processing units to cause the first access node to carry out such operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling operation in a wireless communication system having a first access node that provides service on a first air interface and a second access node that provides service on a second air interface, wherein the first and second access nodes support cooperatively providing dual-connectivity service and support operating in (i) a single-connection-uplink mode for the dual-connectivity service, with uplink user-plane communication being carried on just the second air interface and (ii) a split-uplink mode for the dual-connectivity service, with the uplink user-plane communication being split between the first air interface and the second air interface, the method comprising:

detecting at least a predefined threshold high level of uplink voice muting on the first air interface, wherein detecting at least the predefined threshold high level of uplink voice muting on the first air interface comprises tracking an extent of uplink voice muting on the first air interface and comparing the tracked extent of uplink voice muting with a predefined threshold level of voice muting to determine if the tracked extent of uplink voice muting is at least as high as the predefined threshold level of voice muting; and responsive to the detecting of at least the predefined threshold high level of uplink voice muting on the first air interface, restricting application of the split-uplink mode for the dual-connectivity service.

2. The method of claim 1, wherein detecting at least the predefined threshold high level of uplink voice muting on the first air interface comprises monitoring for absence of expected voice-packet transmission on a voice bearer traversing the first air interface.

3. The method of claim 1, wherein restricting application of the split-uplink mode for the dual-connectivity service comprises disabling application of the split-uplink mode for the dual-connectivity service.

4. The method of claim 3, wherein disabling application of the split-uplink mode for the dual-connectivity service comprises disabling application of the split-uplink mode for a first class of served devices while still allowing application of the split-uplink mode for a second class of served devices.

5. The method of claim 4, wherein the first class of served devices comprises relay devices, and wherein the second class of served devices comprises non-relay devices.

6. The method of claim 3, wherein disabling application of the split-uplink mode for the dual-connectivity service comprises disabling new activation of the split-uplink mode for the dual-connectivity service while still allowing already-activated split-uplink mode for the dual-connectivity service.

7. The method of claim 1, wherein restricting application of the split-uplink mode for the dual-connectivity service comprises modifying a trigger condition for application of the split-uplink mode for the dual-connectivity service, wherein modifying the trigger condition reduces a likelihood of activating the split-uplink mode for the dual-connectivity service.

8. The method of claim 7, wherein, as to a served device, the trigger condition comprises a quantity of uplink data communicated by or buffered by the served device being at least a predefined threshold quantity, and wherein modifying the trigger condition comprises increasing the predefined threshold quantity.

9. The method of claim 1, wherein restricting application of the split-uplink mode for the dual-connectivity service comprises changing an uplink-split ratio to reduce associated uplink data flow on the first air interface.

10. The method of claim 1, wherein the detecting and restricting are carried out by the first access node.

11. The method of claim 1, wherein the first access node is a 4G Long Term Evolution (LTE) evolved Node-B (eNB), wherein the second access node is a 5G New Radio (NR) next-generation Node-B (gNB), and wherein the dual-connectivity service is EUTRA-NR Dual Connectivity (EN-DC) service.

12. In a wireless communication system comprising a first access node configured to provide service on a first air interface and a second access node configured to provide service on a second air interface, wherein the first and second access nodes support cooperatively providing dual-connectivity service and support operating in (i) a single-connection-uplink mode for the dual-connectivity service, with uplink user-plane communication being carried on just the second air interface and (ii) a split-uplink mode for the dual-connectivity service, with the uplink user-plane communication being split between the first air interface and the second air interface, the first access node comprising:

a wireless communication interface through which to engage in air-interface communication on the first air interface; and a controller, wherein the controller is configured to cause the first access node to carry out operations including:

detecting at least a predefined threshold high level of uplink voice muting on the first air interface, wherein detecting at least the predefined threshold high level of uplink voice muting on the first air interface comprises tracking an extent of uplink voice muting on the first air interface and comparing the tracked extent of uplink voice muting with a predefined threshold level of voice muting to determine if the tracked extent of uplink voice muting is at least as high as the predefined threshold level of voice muting, and responsive to the detecting of at least the predefined threshold high level of uplink voice muting on the first air interface, restricting application of the split-uplink mode for the dual-connectivity service.

13. The first access node of claim 12, wherein the controller comprises at least one processing unit, at least one non-transitory data storage, and program instructions stored in the at least one non-transitory data storage and executable by the at least one processing unit to cause the first access node to carry out the operations.

14. The first access node of claim 12, wherein detecting at least the predefined threshold high level of uplink voice muting on the first air interface comprises monitoring for absence of expected voice-packet transmission on a voice bearer traversing the first air interface.

15. The first access node of claim 12, wherein restricting application of the split-uplink mode for the dual-connectivity service comprises disabling application of the split-uplink mode for the dual-connectivity service.

16. The first access node of claim 12, wherein disabling application of the split-uplink mode for the dual-connectivity service comprises disabling application of the split-uplink mode for a first class of served devices while still allowing application of the split-uplink mode for a second class of served devices.

17. The first access node of claim 16, wherein the first class of served devices comprises relay devices, and wherein the second class of served devices comprises non-relay devices.

18. The first access node of claim 12, wherein restricting application of the split-uplink mode for the dual-connectivity service comprises modifying a trigger condition for application of the split-uplink mode for the dual-connectivity service, wherein modifying the trigger condition reduces a likelihood of activating the split-uplink mode for the dual-connectivity service.

19. The first access node of claim 12, wherein the first access node is a 4G Long Term Evolution (LTE) evolved Node-B (eNB), wherein the second access node is a 5G New Radio (NR) next-generation Node-B (gNB), and wherein the dual-connectivity service is EUTRA-NR Dual Connectivity (EN-DC) service.

* * * * *